June 17, 1930.                G. JAVITCH                1,764,567
FILTER FOR LIQUIDS UNDER PRESSURE
Filed April 4, 1929
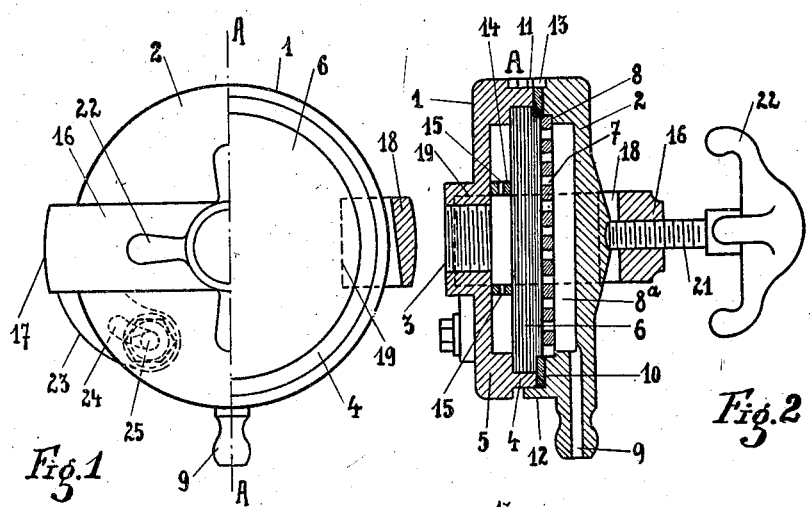
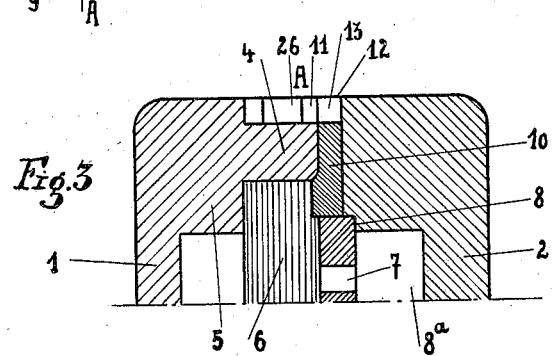
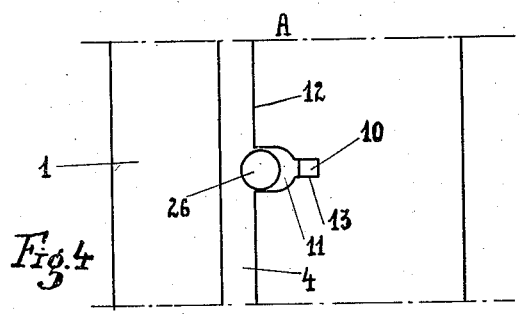
Inventor:
Grégori Javitch
BY
Attorney:

Patented June 17, 1930

1,764,567

UNITED STATES PATENT OFFICE

GRÉGORI JAVITCH, OF LEVALLOIS-PERRET, FRANCE

FILTER FOR LIQUIDS UNDER PRESSURE

Application filed April 4, 1929, Serial No. 352,564, and in France April 5, 1928.

My present invention has for its object to provide an improved filter for liquids under pressure, that is one which is characterized by the combination of a bipartite casing and a filtering device comprising a filtering member and a rose, placed one against the other and arranged between the two halves of the casing, the whole being assembled and held in assembled relation by means of a yoke provided with a set-screw adapted to produce pressure on the casing to secure an efficiently tight joint between the two halves of the casing.

My improved device is furthermore characterized by a filtration indicating device, constituted by an opening provided on the side of the casing and enabling a thin stream of liquid to trickle outwardly as the pressure produced by said set screw is insufficient for securing a perfect filtration.

One preferred embodiment of my invention is illustrated in the accompanying drawings, wherein:

Fig. 1 is a front elevation and vertical section of a filter constructed according to my invention.

Fig. 2 is a section on line A—A of Fig. 1;

Fig. 3 is a sectional view showing the device for tightening the filter and controlling the operation thereof.

Fig. 4 is an elevation of said device.

Referring to the drawings, A is the casing of my improved filter made of two halves 1, 2, the half 1 being provided at the centre of its outer surface with a screw-threaded tubular extension 3 enabling it to be screwed onto the end of a tap distributing liquid under pressure.

Said half 1 has an inner flange 4 whereby it may be fitted into the second half 2 and an annular shoulder 5 serving to compress the peripheral rim of a filtering member 6 arranged between the two halves 1, 2 and the central part of which is held and compressed by a ring 14 carried by the half 1 and provided with perforations 15 for distributing the liquid entering through 3.

The half 2 of the casing A comprises a circular rose 7 supported on a seat 8 provided in the material of said half 2 above a chamber 8$^a$ wherein the filtered liquid is collected before being discharged through the tubular extension 9 on the side of the half 2 and communicating with the chamber 8$^a$.

Arranged between the half 2 and the flange 4 on the half 1 is a joint ring 10 of plastic material.

The half 2 of the casing has a notch 11 in its outer rim 12 ending into a slot 13 adapted to enable the liquid under pressure to leak as the halves 1, 2 are insufficiently pressed against each other and the pressure of the flange 4 on the plastic joint ring 10 is lower than the pressure required for securing a perfect filtration. Such pressure is obtained by means of a yoke 16 adapted to receive the halves 1, 2 between its arms 17, 18 having hooked ends 19, and compress said halves by means of a set screw 21 bearing upon the base 16 of the yoke and provided with an operating handle 22.

The hook 19 at the end of one of the yoke arms 16 has an ear 23 with an eye 24 by means of which said yoke may be attached to the half 1 by a bolt 25, whilst at the same time enabling said half 1 to be moved angularly about the bolt 25 if it is desired to disconnect the device.

The operation of the device described is as follows:

The filtering member 6 being arranged in the half 1 above the rose 7, the half 2 is fitted onto the half 1 and its position on the latter determined by a projection or pin 26 engaging the notch 11. The case A being thus completely closed, is inserted between the arms 17, 18 of the yoke 16 by causing same to move about the bolt 25, bringing the centre of the half 2 below the set screw 21 which is then operated to compress the casing A against the hooked ends 19 of the yoke 16, whereupon the casing A will be screwed by its extension 3 on the end of the cock discharging liquid under pressure. If the action of the set-screw 21 is insufficient, an indicating leakage will be produced at 13 and the set-screw should be tightened further. If the action of the set-screw is sufficient, the liquid entering through 3 will be distributed through the perforations 15 in the ring 14 upon the surface of the filtering member 6, through which it will be filtered to be collected in the chamber $8^a$, whence it may be discharged through the tubular extension 9.

It will be obvious that the arrangements shown have been described by way of example only and that many changes may be made therein without departing from the spirit of my invention.

Having now fully described my said invention, what I claim and desire to secure by Letters Patent, is:

1. In a filter for liquids under pressure, the combination of a filtering device comprising a casing made of two halves, a yoke and a set-screw on said yoke adapted to secure a filtering member between said halves, means whereby a leak is rendered visible if the pressure of said set-screw is insufficient for ensuring the perfect filtration of the whole quantity of liquid flowing through the filter.

2. In a filter for liquids under pressure, a filtering device comprising a casing made of two halves, a filtering member and a joint ring between said two halves, a notch in the edge of one of said halves, a pin on the edge of the other half and engaging said notch, a yoke and a set-screw on said yoke adapted to secure said filtering member and ring between said halves, and a small slot in said notch through which a leak is readily visible when the pressure of said set-screw is insufficient for ensuring the complete filtration of the whole quantity of liquid flowing through the filter.

GRÉGORI JAVITCH.